Nov. 6, 1934.    P. A. BORDEN    1,979,311
SYSTEM OF MEASUREMENT AND CONTROL
Filed May 2, 1933    2 Sheets-Sheet 1
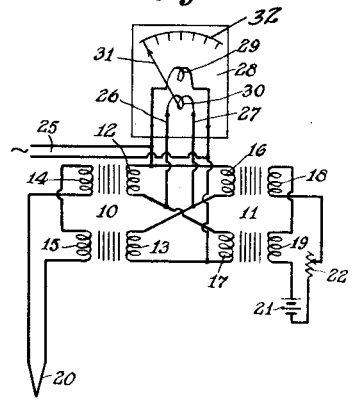
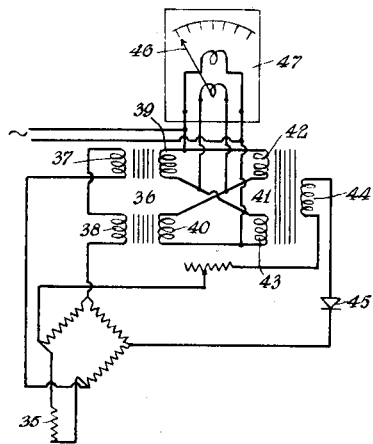
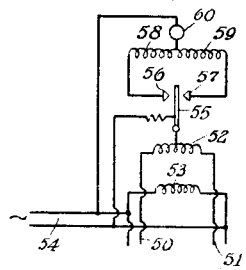
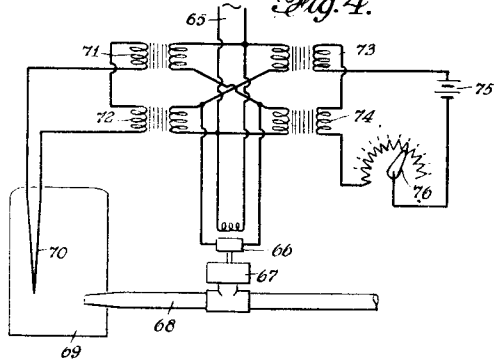
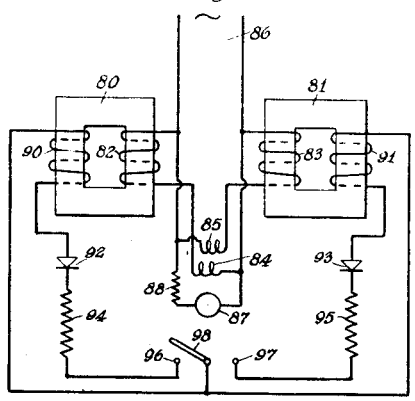
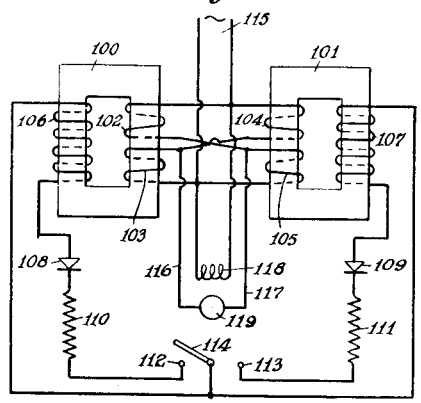
INVENTOR
PERRY A. BORDEN
BY
*Fred'k K Schuetts*
ATTORNEY Nov. 6, 1934.                      P. A. BORDEN                       1,979,311
                          SYSTEM OF MEASUREMENT AND CONTROL
                              Filed May 2, 1933              2 Sheets-Sheet 2

INVENTOR
PERRY A. BORDEN
BY
ATTORNEY

Patented Nov. 6, 1934

1,979,311

UNITED STATES PATENT OFFICE 1,979,311

SYSTEM OF MEASUREMENT AND CONTROL

Perry A. Borden, Waterbury, Conn., assignor to The Bristol Company, Waterbury, Conn., a corporation of Connecticut Application May 2, 1933, Serial No. 668,946

16 Claims. (Cl. 236—69)

The invention relates to electrical apparatus adapted for the measurement and/or automatic control of a condition subject to change.

It has for an object the provision of a reactor device embodying a core or cores of variable magnetic permeability, the permeability of the magnetic circuit of the reactor being varied by the condition under measurement and/or control to effect thereby changes in the impedance of an alternating current circuit. The variation in the alternating current thus produced in this circuit is utilized for the measurement and/or control of the initially varying magnitude or condition.

A further object of the invention resides in the provision, for use in the measurement and control of variable magnitudes and/or conditions, of an amplifying relay comprising no moving parts.

Still another object of the invention resides in the provision of a relay of the above nature which is characterized by a positive time lag of operation; also, in means for adjusting the time of response due to this lag.

Another object of the invention resides in the provision of means for control of the direction and speed in rotation of a reversible electric motor wherein no contacts are required in the motor circuit.

A further object of the invention is to provide a system and apparatus of the nature aforesaid which shall be simple and inexpensive in construction, efficient and reliable in operation, and subject to a minimum of maintenance requirements.

It is well known that an iron-cored reactor of variable magnetic permeability may be caused to lose the whole or part of its magnetic permeability, and thereby its inductive properties, to a degree depending upon the extent to which the magnetic properties of the core have been disturbed.

As set forth in U. S. Patent #720,884, a unidirectional flux may be developed in the iron core of a transformer or reactor so that the iron will be restricted from following its normal cycle of magnetization under an alternating magnetizing influence. In other words, the self-induction of a single winding will be decreased to an extent depending upon the value of such unidirectional flux. If then one (the primary) winding of such a reactor be connected to a source of alternating current and another (the secondary) winding on the same core of the reactor be caused to carry a unidirectional current, the amount of alternating current which will flow in the alternating (primary) winding may be controlled by the magnitude of the unidirectional current. This phenomenon is due to the more or less saturation of the iron of the reactor by the unidirectional current; and the winding in which such unidirectional current flows will hereinafter be referred to as "the saturating winding".

In carrying out the invention, use is made of this phenomenon in the measurement of a condition of varying magnitude, and particularly in combination with responsive elements which set up but a relatively small actuating (electromotive) force under the variations in magnitude of the condition to which said element is exposed. In the utilization of the aforesaid phenomenon it is possible to provide for a considerable degree of amplification between the magnitude of power changes in the saturating winding and in the alternating current winding.

Furthermore, the invention contemplates the control of the condition through the change produced thereby in the current flow within the saturating winding.

So far as the provision of the unidirectional current is concerned, this may be derived from an external source or directly from an element responsive to the condition, for example, a thermoelectric couple, in the latter instance, and from a voltaic battery or the like in the former.

Or, the unidirectional current may be derived from the saturating winding itself by inserting in its circuit a suitable rectifying element in which case an unopposed alternating electromotive force is applied to a rectifier in the circuit.

In those instances in which saturation is obtained from an external direct current source, provision is made for balancing out alternating electromotive forces which may be induced in saturating windings, so that there is no tendency for alternating current to circulate therein.

The iron-cored reactor utilized, or group of reactors, may be placed in circuit between an alternating current source and a measuring instrument, relay or motor; and a magnitude to be measured and/or controlled, such as a temperature, is caused by means of a thermocouple, resistance thermometer or the like, to effect variations in the value of unidirectional current in the saturating winding of the reactor. This brings about change in the magnetic permeability of the reactor cores to change the total reactance of the alternating current circuit or the relative reactance values of associated parts of the circuit. The resulting variations in flow of alternating current, or in the distribution of alternating potential, represent, to a greatly amplified degree, variations in the measured magnitude. These variations of alternating potential or current are caused to produce response in a rugged measuring instrument, an electromechanical relay, or an electric motor capable of effecting regulation of the temperature or other variable magnitude or condition upon which the primary measurement is performed.

The nature of the invention, however, will best be understood when described in connection with the accompanying drawings, in which:

Fig. 1 is a diagrammatic view illustrating the novel system and wherein the excitation of a saturating winding, or rather windings, is derived directly from a thermocouple to actuate a measuring instrument.

Fig. 2 is a diagrammatic view of the novel system and wherein the excitation of a single saturating winding is supplied by rectified current; and wherein the effective value of the excitation is controlled by a resistance thermometer, the whole system operating as a measuring instrument.

Fig. 3 is a fragmentary diagrammatic view of a system similar to that illustrated in Fig. 1, but wherein a directional alternating current relay is substituted for the measuring instrument and is adapted to control a double-field motor.

Fig. 4 is a diagrammatic view illustrating the invention as applied to the control of a furnace temperature.

Fig. 5 is a diagrammatic view showing the novel system equipped with self-exciting reactors, and arranged for the control of a reversible motor of the double-field type.

Fig. 6 represents an alternative arrangement adapted to control a reversible motor of the single-field type.

Figure 7:
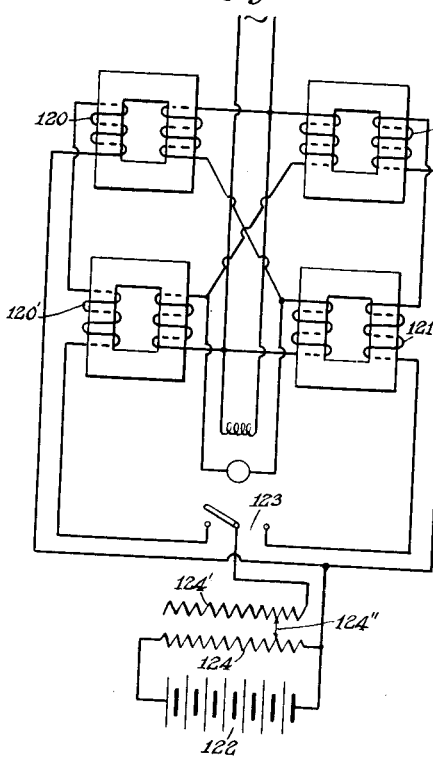
Fig. 7 is a diagrammatic view illustrating the use of four reactors, and also the application of means for varying the time characteristics of a set of reactors whose saturating windings are being excited.

Referring to the drawings, more particularly Fig. 1, two reactors, or rather reactor groups, 10 and 11 are indicated, each group comprising a pair of iron cores, and associated alternating current and saturating windings. For example, the group 10 comprises the alternating current windings 12 and 13 and associated saturating windings 14 and 15 which are duplicates of one another, while the group 11 includes the alternating current windings 16 and 17 and the saturating windings 18 and 19 which are also duplicates of one another. The saturating windings of the reactor 10 are arranged in series and are adapted to be energized directly from a thermocouple 20. Windings 18 and 19 of the reactor 11 are likewise connected in series and are arranged in circuit with a source of unidirectional current, such as the battery 21. A variable resistor 22 included in this circuit serves to adjust the current flowing therein to the desired value. By thus opposing the duplicate saturating windings, voltages set up therein by the alternating current will be equal and opposite and there will consequently be no tendency for alternating current to circulate in these windings.

The alternating current windings are interconnected, as shown, windings 12 and 17 being connected in series across the alternating current supply 25, and a tap 26 is taken off between them. Similarly, windings 13 and 16 are connected in series across the alternating current supply 25 with a tap 27 taken off between them.

An instrument 28 of the electrodynamic type, similar to a watt-meter, has its field-winding 29 energized directly from the source of alternating current supply 25, and its moving coil 30 is connected to the mid-taps 26 and 27 of the reactor groups.

The operation of the system is as follows: With no direct current flowing in either of the pairs of saturating windings, no voltage will be applied to the moving coil of the instrument. This is due to the fact that windings 12 and 13 being upon a common core, the voltages in them are identical; and for the same reason, the voltages set up in windings 16 and 17 will be identical.

Furthermore, since the sum of the voltages across the former windings (being the total supply voltage) is equal to the sum of the voltages across the latter windings, it follows that the voltages across the four individual windings are equal, each to each, and that therefore the taps 26 and 27 are normally at the same potential, with a consequence that no voltage will be applied to the moving coil 30 to move the same, and the pointer 31 will rest at its zero position. However, upon the thermocouple 20 becoming a source of direct current in setting up an E. M. F., as in subjecting the same to a change in temperature, this unidirectional current will flow in the saturating windings 14 and 15 to reduce the inductance of the reactor 10, so that the impedances of windings 12 and 13 will become materially less than the impedance of windings 16 and 17 of reactor 11.

The potential of the one tap 26 will thereby approach that of one side of the supply line 25, while the potential of tap 27 will approach that of the other side. A voltage not greater than that of the supply is thus applied to coil 30 to cause current flow therein.

This provides for an indication by pointer 31 of the instrument with reference to the scale 32 thereof; and the deflection of said pointer will be a measure of the magnitude of the saturating current and therefore of the temperature of the thermocouple 20.

Magnetization of the cores of the reactor group 11 through energization of windings 18 and 19 from the battery 21, will tend to restore the balance and return the pointer 31 of the instrument 28 to its zero position, so that current derived from this source may be used for corrective purposes, if desired.

The indication of the instrument, or response of any electro-receptive device connected in the circuits represented by the coils 27 and 29, may thus be made representative of the difference of the saturating effects in the two groups of reactors. However, since magnetization of one set of cores tends to neutralize the effect of magnetization of the other set, and since the polarity of the unidirectional current does not enter into the principle, it can only be strictly said that the ultimate effect is representative of the difference of the two saturating effects.

Various expedients for effecting measurement and/or control of a variable condition through the excitation of the one set of saturating windings, may be adopted. For example, in place of the thermocouple 20 a resistance thermometer 35, Fig. 2, may be utilized; and the saturation of the reactor made subject to control of a bridge including the said thermometer which is to be located in one leg of the bridge.

Thus, the reactor group 36 is provided with separate and duplicate saturating windings 37 and 38 connected in series and in opposed relationship similarly to the windings 14 and 15 of the system illustrated in Fig. 1, so that there is no tendency for alternating current to circulate therein. Windings 37 and 38, furthermore, have associated therewith alternating current windings 39 and 40. A further reactor unit 41 is of a type having two duplicate alternating current windings 42 and 43, while but one saturating winding 44 is associated therewith; and the energizing circuit for the saturating winding is completed through a rectifier 45 and a bridge circuit including the resistance thermometer 35.

The "galvanometer circuit" of the bridge is connected across the saturating windings 37 and 38 to energize the same under variations in the resistance of the resistance thermometer 35 in accordance with the changes in temperature to which it is exposed; and the changes set up will thus correspondingly deflect the pointer element 46 of instrument 47.

The alternating current circuit for this purpose is identical with that described in connection with the system shown in Fig. 1; and by adjustment of the bridge circuit for a fixed reference temperature, a condition of balance between the two sides of the reactor system may be produced so that an indication representative of the temperature change may be obtained on the instrument through upsetting of the balance of the bridge circuit. It is manifest that the foregoing arrangement will perform in a similar manner if the reactor 41 were left without a secondary or saturating winding, as the winding 44, and the direct current for the bridge circuit were derived from a voltaic cell or other external direct current source of constant potential (not shown).

In place of the measuring instrument it will be understood, of course, that other apparatus may be actuated by the alternating current; and, as indicated in Fig. 3 of the drawings, a relay device is substituted and is designed for the automatic control of a valve-operating motor or the like. Thus, the taps 50 and 51 from the reactor apparatus (not shown) are connected as in the previously described embodiment to the moving coil 52 of the relay while its field coil 53 is permanently connected to the source of alternating current supply 54. A contact element 55, movable with the coil 52, is designed to make contact with either of a pair of contacts 56 and 57 disposed at opposite sides of said contact elements 55 to supply alternating current to one or the other of a pair of fields 58 and 59 of a reversible double-field motor 60 which may be caused to operate various apparatus, for example, a valve or other devices (not shown) and as is well understood.

Fig. 4 illustrates a further development of the control feature by means of the novel reactor system, as in the control of the supply of alternating current from the main 65 to an actuating motor 66 for a control valve 67 regulating the supply of fuel, for example, through the fuel line 68 to a furnace 69. In the latter is located a thermocouple 70 for energization of the duplicate saturating windings 71 and 72 of the reactor unit. The corresponding duplicate saturating windings 73 and 74 of the other group of reactors are energized from a source of unidirectional current such as the constant voltage battery 75; and when the saturating effect of current from the thermocouple 70 equals that from the battery 75, the voltage applied to the armature of the motor 66 will be zero.

As the saturating effect of current from the couple 70 varies above and below that from battery 75, due to temperature changes in the furnace 69, voltage applied to the armature of motor 66 will vary both in direction and in intensity, with consequent tendency to regulate the fuel supply through the action of valve 67 and in such a manner as to compensate for changes in the temperature prevailing in furnace 69. The actual control point to be maintained may be established by accordingly setting a graduated rheostat 76 included in the circuit of the saturating windings 73 and 74.

Referring to Figs. 5 and 6, an arrangement is indicated for applying the foregoing principles to the direct control of an electric motor, Fig. 5 showing the arrangement for operation of a double-field motor and Fig. 6 for a single-field motor. In the former embodiment, two reactors 80 and 81 are connected with their respective alternating current windings 82 and 83 in series with the field coils 84 and 85 of the motor, alternating curent being obtained from the source of supply 86 which is also connected directly to the armature 87 of the motor, with a protective resistor 88 in series therewith.

The saturating windings 90 and 91 of the reactors 80 and 81, respectively, are connected through rectifier elements 92 and 93 and limiting resistors 94 and 95 to the opposite terminals 96 and 97, respectively, of a single-pole double-throw switch. The blade 98 of this switch is connected to the common lead of both windings circuits so that by throwing the switch in one direction or the other, the circuit may be completed at a terminal 96 or 97 to one or the other of the saturating windings 90 or 91 and through the associated rectifier and resistor.

In its neutral position both secondaries or saturating windings remain open; and the reactance of each of the reactor units 80 and 81 will be so high that the current flowing in the opposed field windings 82 and 83 will be of small value. However, when a circuit to a particular saturating winding is closed, the unidirectional current in this winding will cause the reactor to lose its reactive characteristic with a resultant increase in the alternating current flowing in the primary winding of such reactor and consequently in the corresponding field coil of the motor to produce rotation in the appropriate direction. A reversal of the switch to the opposite contact will first reduce the current in the previously energized field coil to its normal negligible value and will then increase to the operating value the current flowing in the opposite coil to operate the motor in a reverse direction.

In Fig. 6 a similar combination of reactors is disclosed, but the arrangement is modified for the operation of a single-field motor in either direction. To this end, the reactors 100 and 101 are each provided with two identical alternating current windings 102, 103 and 104, 105, respectively, and with single associated saturating windings 106 and 107, respectively.

Corresponding rectifiers 108 and 109 and resistors 110 and 111 are connected in series with the said saturating windings and with the terminals 112 and 113, which terminals are adapted for alternative engagement with the blade 114 of the motor reversing switch.

The windings 102 and 105 are connected in series across the alternating current supply 115, with a tap 116 taken off between them; and, similarly, windings 103 and 104 are connected in series across the alternating current supply, with a tap 117 taken off between them. The motor comprises the field 118 which is permanently connected to the source of alternating current supply 115, and an armature 119 which is connected to the taps 116 and 117.

Upon the combination being energized from an alternating current source, as the supply 115, windings 102 and 103 being upon a common core, the voltages in them are identical; and for the same reason, the voltages set up in windings 104 and 105 will be identical. Furthermore, since the sum of the voltages across windings 103 and 104 (being the total supply voltage) is equal to the sum of the voltages across the windings 102 and 105, it follows that the voltages across the four individual windings are equal, each to each, and that therefore the taps 116 and 117 are normally at the same potential, with a consequence that no voltage will be applied to the armature 121 of the motor to cause rotation thereof. When the switch blade 114 then engages either one of the contact-terminals 112 and 113, unidirectional current will be caused to circulate in a corresponding saturating winding so that the inductance of the reactor thereof will be reduced. The impedance of the alternating current windings of this reactor will therefore become materially less than the impedance of the alternating current windings of the opposite reactor; and the potential of the one tap will approach that of the supply line 115, while the potential of the other tap will approach that of the other side of the line.

A voltage difference therefore prevails, having a magnitude between zero and that of the supply line, and is applied to the armature of the motor, causing it to rotate in a direction determined by the polarity of the armature voltage relative to the supply voltage which is permanently applied to the field 118. Throwing the switch to the opposite contact, first restores the previously saturated reactor to its normal condition and causes saturation of the core of the other reactor so that voltage across the armature is caused to build up in the opposite direction, relatively to the line voltage, with a consequent reversed rotation of the motor.

It will be further appreciated that in all the embodiments hereinbefore described, since changes in the unidirectional magnetization of a closed magnetic circuit cannot be effected instantaneously because of the time element inseparable from an inductive circuit, there will be a time-lag between the controlling variations in the unidirectional electromotive force applied to the saturating windings and the ultimate changes in the magnitude of the alternating current output from the reactors. Thus, there is automatically introduced a time element which is of advantage, particularly in the operation of reversible motors, in preventing "plugging", and avoiding thereby severe electrical and mechanical stresses in the motor. The value of this time is subject to the relative magnitude of resistance and inductance in the saturating circuit, and may be adjusted as desired. For example, reference being had to Fig. 7, a reactor combination is shown similar to that set forth in Fig. 4 and including the saturating windings 120, 120' and 121, 121'. These windings, however, are arranged for excitation from an external source, as the battery 122, and through a double-throw switch 123, rendering the reactor combination suitable for use as a relay, for example, in the manner set forth hereinafter in connection with the control system shown in Fig. 8.

Furthermore, the saturating current is taken from the battery 122 through a potentiometer type rheostat 124. In series with the saturating winding circuits is a further rheostat 124', and between the two is a common slider contact 124'', the two resistances being so proportioned that the total magnetizing effect of one or the other of the saturating windings is substantially constant, whatever the setting of the slider 124'' may be.

When the saturating circuit contains a high proportion of resistance relatively to its inductance, magnetization will be accomplished more rapidly than when the resistance included in said circuit is low in proportion to the inductance of the cores. Thus, by adjusting the position of the slider 124'', it is possible to control the time required for saturation, and hence the time of response of the reactor, without changing the ultimate value of the magnetization.

Figure 8:
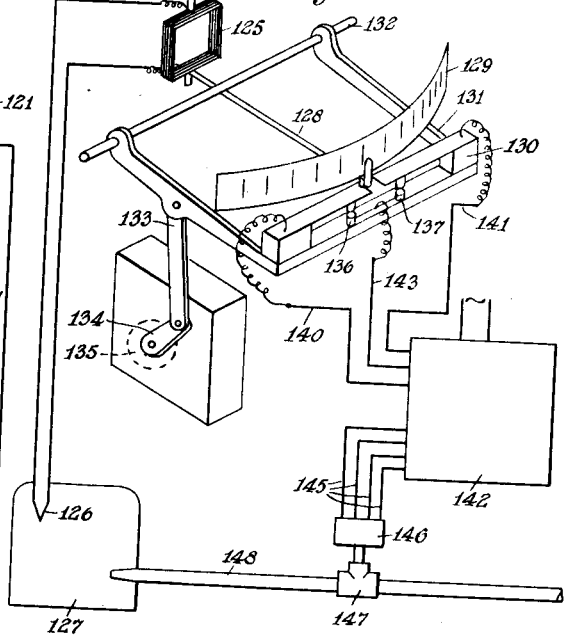
Fig. 8 is a diagrammatic view, partly in perspective, illustrating the application of a sensitive control instrument to the novel control system.

In Fig. 8 a complete control system is diagrammatically set forth, and embodies a switching or contact-making device which is operated from a delicate measuring instrument of great sensitivity such, for example, as a d'Arsonval galvanometer. The control instrument may be of the type such, for example, as is described in U. S. Patent #1,675,359 embodying the movable coil 125 actuated, for example, from the thermocouple 126 exposed to the temperature variations in a furnace 127. The small magnitude of direct current, developed by this thermocouple, is caused to actuate or deflect the pointer 128 over a graduated scale 129 as a measure of the temperature to which the thermocouple is exposed. Beneath this pointer element, and adapted to be engaged thereby, is the switching mechanism 130 supported on a bracket 131 and adapted to be gently reciprocated vertically about a shaft 132 by a connecting rod 133 and crank 134 driven by a motor 135. The contact members 136 and 137 of the switch mechanism are adapted to be closed by engagement with the pointer 128 upon the upstroke of the bracket 131 as the temperature falls or rises respectively below and above a predetermined set point.

These contacts are designed to be connected through the leads 140 and 141, respectively, to the reactor device indicated generally by the reference character 142 and of a nature of either of the devices previously set forth in connection with the description of Figs. 5 to 7. A common lead 143 from the switching device is also connected to the reactor system 142; and, from the same, four leads 145 connect to electric motor 146 for controlling a valve 147 regulating the fuel supply passing through the fuel line 148 to the furnace 127.

In this manner a change in the temperature of furnace 127 above the predetermined set point, or below the same, will be reflected in a change in the position of the pointer 128 with consequent change in the saturation condition of the windings of the reactor system for operating the motor in one direction or the other to correspondingly vary the valve opening and to regulate thereby the amount of fuel supplied to said furnace for correcting the departure in the temperature condition of said furnace.

Figure 9:
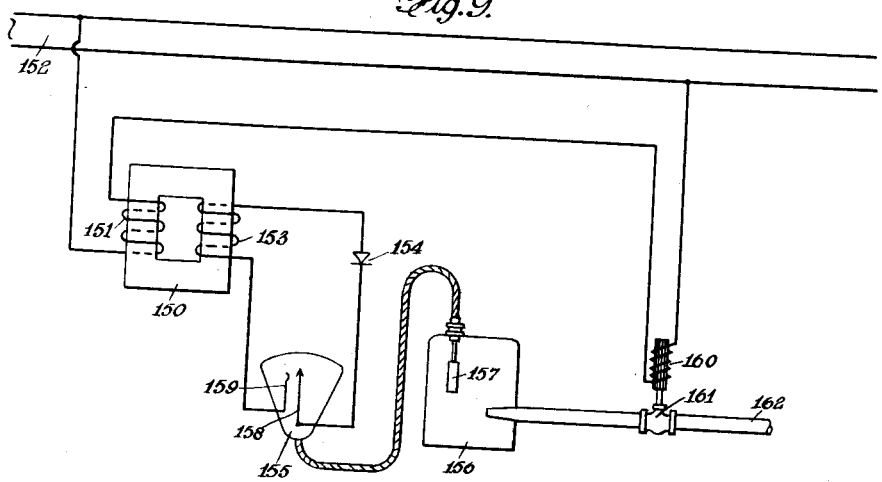
Fig. 9 is a diagrammatic view illustrating a simplified form of the control system.

Fig. 9 shows a simplified form of the control system in which but a single reactor 150 is employed, the same having its alternating current winding 151 connected to the source of alternating current 152. The saturating winding 153 of the reactor is connected through the rectifier 154 to a contact-making or controller device 155 operated, for example, from the furnace 156 through a suitable temperature-responsive element 157 to actuate the pointer or contact-making member 158 of the said controller. The arrangement is such that when the temperature in furnace 156 falls below a predetermined degree, the contact-making element 158 will engage the contact 159 to cause a flow of unidirectional current through the saturating winding 153. An alternating current solenoid 160 included in the reactor circuit will then become energized to open the valve 161 in the fuel line 162 to the furnace.

I claim:

1. Electrical measuring and/or control system, comprising a source of alternating current, a reactor member having a circuit connected thereto, and including a pair of iron-cored reactor elements, duplicate saturating windings about each of the pair of the reactor elements, the windings for each pair being connected in opposed relationship, means subject to a variable condition adapted to set up a flow of unidirectional current in one of the pairs of said saturating windings, means to set up a flow of unidirectional current in the other of said pairs, and means connected with the reactor circuit for measuring and/or controlling the said condition.

2. Electrical measuring and/or control system, comprising a source of alternating current, a reactor member having a circuit connected thereto, the reactor member embodying two groups, one group including a pair of iron cores, a pair of duplicate alternating current windings associated with the respective cores and a pair of duplicate saturating windings associated with said cores, and the other group including a single iron core, a pair of duplicate alternating current windings and a single saturating winding associated therewith, means to effect a flow of unidirectional current in the single saturating winding, means subject to a variable condition adapted to set up a flow of unidirectional current in the pair of duplicate saturating windings, and means connected with the reactor circuit for measuring and/or controlling the said condition.

3. Electrical measuring and/or control system, comprising a source of alternating current, a reactor member having a circuit connected thereto, the reactor member embodying two groups, one group including a pair of iron cores, a pair of duplicate alternating current windings associated with the respective cores, and a pair of duplicate saturating windings associated with said cores, and the other group including a single iron core and a pair of duplicate alternating current windings and a single saturating winding associated therewith, a bridge circuit and source of unidirectional current connected to the saturating winding associated with the single core of the reactor member, a resistance thermometer exposed to a variable temperature condition and included in one leg of said bridge, means to connect the duplicate pair of saturating windings across the "galvanometer circuit" of the bridge, and means connected with the reactor circuit for measuring and/or controlling the condition to which said thermometer is exposed.

4. Electrical measuring and/or control system, comprising a source of alternating current, a reactor member having a circuit connected thereto, the reactor member embodying two groups, one group including a pair of iron cores, a pair of duplicate alternating current windings associated with the respective cores, and a pair of duplicate saturating windings associated with said cores, and the other group including a single iron core and a pair of duplicate alternating current windings and a single saturating winding associated therewith, a bridge circuit and a rectifier in series therewith connected to the saturating winding associated with the single core of the reactor member, a resistance thermometer exposed to a variable temperature condition and included in one leg of said bridge, means to connect the duplicate pair of saturating windings across the "galvanometer circuit" of the bridge, and means connected with the reactor circuit for measuring and/or controlling the condition to which said thermometer is exposed.

5. In combination, a source of alternating current, a plurality of reactors having magnetic circuits of variable permeabilities, windings thereon adapted to provide reactance in the source of alternating current, and further magnetizing windings and sources of direct current to energize the same, whereby the magnetic circuit of one of said reactors may receive unidirectional excitation independently of another, together with means adapted to be included in series with a magnetizing winding and responsive to a variable condition for controlling a said unidirectional excitation, and an electro-responsive device adapted to receive energy from said source of alternating current in a degree governed by the magnitude of said controlling unidirectional excitation.

6. In an electrical control system including a source of alternating current: the combination with two reactors, each having a core of variable magnetic permeability and two independent magnetizing windings thereon; of a network adapted to receive energy from the alternating current source, a motor to receive energy from said network, the said one independent winding of each of the plurality of reactors forming a part of said network, means adapted to be included in series with a magnetizing winding and to deliver direct-current energy alternatively to one or the other of the other said independent windings of each of the said reactors, and means responsive to a condition to be controlled and adapted to effect changes in the flow of said direct-current energy.

7. In an electrical control system including a source of alternating current: the combination with two reactors, each having a core of variable magnetic permeability and two independent windings thereon; of a network adapted to receive energy from the alternating current source, a motor to receive energy from said network, the said one independent winding of each of the plurality of reactors forming a part of said network, a double-throw switch to deliver direct-current energy to one or the other of the other of said independent windings of each of the said reactors, and means responsive to a condition to be controlled to effect the actuation of said switch.

8. In an electrical control system including the combination with two reactors, each having a core of variable magnetic permeability and two independent windings thereon; of a network adapted to receive energy from the alternating current source, a motor to receive energy from said network, the said one independent winding of each of the plurality of reactors forming a part of said network, a double-throw switch, a rectifier and a resistor included in circuit in the one of and the said other independent windings and with the one terminal of a switch, a rectifier and a resistor included in circuit with the other of the said other of the independent windings and the opposite terminal of the switch, and means responsive to a condition to be controlled to effect the actuation of said switch.

9. Electrical control system, comprising a source of alternating current, a reactor member having a circuit connected thereto, saturating means for the reactor member including an element, subject to a variable condition to be controlled, for setting up a flow of unidirectional current, a reversible electric motor connected with the reactor circuit for controlling said condition, and means to adjust the electromagnetic characteristic of the reactor member to govern the rate of variation in its permeability in response to changes affecting the means for setting up the unidirectional current flow.

10. Electrical control system, comprising a source of alternating current, a reactor member having a circuit connected thereto, saturating means for the reactor member including an element, subject to a variable condition to be controlled, for setting up a flow of unidirectional current, a reversible electric motor connected with the reactor circuit for controlling said condition, and impedance-varying means to adjust the electromagnetic characteristic of the reactor member to govern the rate of variation in its permeability in response to changes affecting the means for setting up the unidirectional current flow.

11. Electrical control system, comprising a source of alternating current, a reactor member having a circuit connected thereto, saturating means for the reactor member including an element, subject to a variable condition to be controlled, for setting up a flow of unidirectional current, a reversible electric motor connected with the reactor circuit for controlling said condition, and means including adjustable resistance to adjust the electromagnetic characteristic of the reactor member to govern the rate of variation in its permeability in response to changes affecting the means for setting up the undirectional current flow.

12. Electrical control system, comprising a source of alternating current, a reactor member having a circuit connected thereto, saturating means for the reactor member including an element, subject to a variable condition to be controlled, for setting up a flow of unidirectional current, and a relay device having oppositely disposed contacts and connected with the reactor circuit, a reversible motor connected to the source of current supply through the contacts of the relay for actuation in opposite directions in accordance with the energization of one or the other of the relay contacts and adapted to control the said condition.

13. Means for controlling the direction and speed of operation of a reversible alternating current motor, comprising a source of alternating current, a bridge circuit connected to said source and including a plurality of reactors having cores of variable magnetic permeability, said bridge circuit being permanently connected to said motor and to the source of alternating current power, and means for varying the magnetic condition of said cores independently of that of another of said cores.

14. Electrical measuring and/or control system, comprising a source of alternating current, a reactor member having a circuit connected thereto, a magnetizing circuit associated with the reactor, means adapted to be included in series with the magnetizing circuit and subject to a variable condition for magnetizing directly the reactor member, and means connected with the reactor circuit for measuring and/or controlling the said condition.

15. Electrical measuring and/or control system, comprising a source of alternating current, a reactor member having a circuit connected thereto, a magnetizing circuit associated with the reactor, means adapted to be included in series with the magnetizing circuit and subject to a variable condition for magnetizing directly the reactor member, and an electrodynamic-type instrument connected with the reactor circuit for measuring and/or controlling the said condition.

16. Electrical measuring and/or control system, comprising a source of alternating current, a reactor member having a circuit connected thereto, a magnetizing circuit associated with the reactor, a temperature-sensitive element exposed to a variable temperature condition for setting up a flow of unidirectional current and included in series in the magnetizing circuit, and means connected with the reactor circuit for measuring and/or controlling the said condition.

PERRY A. BORDEN.